United States Patent
Osborn et al.

(10) Patent No.: US 12,106,284 B2
(45) Date of Patent: Oct. 1, 2024

(54) LOCAL HARDWARE DEACTIVATION OF A TRANSACTION CARD

(71) Applicant: Capital One Services, LLC, McLean, VA (US)

(72) Inventors: Kevin Osborn, Newton Highlands, MA (US); David Kelly Wurmfeld, Palm Bay, FL (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/677,115

(22) Filed: Feb. 22, 2022

(65) Prior Publication Data
US 2023/0267448 A1 Aug. 24, 2023

(51) Int. Cl.
*G06Q 20/34* (2012.01)
*G06K 7/08* (2006.01)

(52) U.S. Cl.
CPC ........... *G06Q 20/354* (2013.01); *G06K 7/081* (2013.01); *G06Q 20/341* (2013.01)

(58) Field of Classification Search
None
See application file for complete search history.

(56) References Cited

U.S. PATENT DOCUMENTS

| | | | | |
|---|---|---|---|---|
| 2002/0170473 A1* | 11/2002 | Fettis | ................... | G08B 15/00 109/23 |
| 2003/0085286 A1* | 5/2003 | Kelley | ................... | G07F 7/1008 235/492 |
| 2006/0004483 A1* | 1/2006 | Neff | ................... | G06K 19/07716 700/219 |
| 2006/0273149 A1* | 12/2006 | Awano | ................... | G06K 19/08 235/379 |
| 2015/0161601 A1* | 6/2015 | Matsumoto | .......... | G06Q 20/353 705/17 |
| 2016/0188890 A1* | 6/2016 | Naeimi | ............... | G06F 12/1433 711/163 |
| 2016/0188916 A1* | 6/2016 | Amarnath | ........ | G06K 19/07745 235/449 |
| 2016/0217455 A1* | 7/2016 | Hosny | ................. | G06Q 20/4012 |
| 2016/0260086 A1* | 9/2016 | Cho | ................... | G06Q 20/3224 |
| 2021/0241283 A1* | 8/2021 | Kumawat | .......... | G06Q 20/4093 |
| 2022/0180353 A1* | 6/2022 | Adcock | ............. | G06Q 20/4015 |

* cited by examiner

*Primary Examiner* — William J Jacob
(74) *Attorney, Agent, or Firm* — Foley & Lardner LLP

(57) ABSTRACT

Methods and systems are described herein for locally deactivating transaction cards to prevent offline transactions. A processor affixed to the transaction card may be used to locally deactivate transaction cards. The processor may receive a signal from a transaction terminal requesting a connection with the transaction card and may establish a connection with the transaction terminal. The processor may receive an indication to deactivate the transaction card and in response to receiving the indication apply an electric current to a stripe deactivating element that deactivates at least a portion of one or more tracks of a stripe on the transaction card and cause, via a built-in circuit, a predetermined increase in the electric current to the processor that causes a pathway that enables power distribution to the processor to be destroyed.

17 Claims, 6 Drawing Sheets

600

LOCAL HARDWARE DEACTIVATION OF A TRANSACTION CARD

BACKGROUND

Currently security cards have many uses. For example, security cards are used to access buildings, authenticate with computing systems, and perform transactions. Generally, these cards are used with card readers that read data from the card and perform an action depending on the context of the usage. For example, security cards may be used in gaining access to buildings and/or rooms within a building. A card may be read by a computing device (e.g., via a card reader) connected with a door within a building. The computing device may then transmit the card data to a remote location (e.g., a datacenter storing account information) where a server system may determine whether the card has access to open that particular door. In certain instances (e.g., when access expires or is no longer needed), those security cards may be configured to no longer work, for example, by using a graphical user interface generated by a server. The changes are then pushed down to local systems and those local systems then prevent access for particular cards. In certain situations, however, the changes may be received by certain systems, but may not be received by other systems (e.g., because of network outages or because those systems synchronize with the server once a day/week/month etc.). Thus, cards that should not enable access will continue to allow access where access should not be granted. Thus, it may be beneficial to physically deactivate a card locally so that the card cannot be used in terminals/readers that have not been updated yet.

SUMMARY

Methods and systems are described herein for locally deactivating transaction cards to prevent offline transactions. A processor associated with the transaction card may be used in the process to locally deactivate transaction cards. The processor on the transaction card may receive a signal from a transaction terminal requesting a connection with the transaction card. For example, the transaction card may be inserted into a card reader or may receive a wireless request from a terminal or another reader device (e.g., when the terminal or another device detects the transaction card in the vicinity) to connect.

The processor may establish the connection with the transaction terminal. For example, the processor may be associated with on-card components that are able to use using an electrical current supplied by the transaction terminal to power the processor. Thus, the card reader may supply electricity to the processor on the card to establish a connection between the card and the computing device associated with the card reader.

The processor may then receive an indication to deactivate the transaction card. For example, the computing device associated with the card reader may store a list of cards that have been deactivated at a server or another remote computing device. When the transaction card connects, the computing device associated with the card reader may determine that the card should be deactivated locally so that another card reader or terminal that has not received deactivation data does not grant access to the particular transaction card. The card reader may then transmit a command and/or a request to the processor on the card to locally deactivate the transaction card.

In some embodiments, the indication to deactivate the transaction card may be received as part of the connection process that authenticates the card with the transaction terminal. Thus, the processor associated with the transaction card may transmit card authentication data to the transaction terminal and receive from the transaction terminal a response to the card authentication data. When the transaction terminal receives the authentication data, the transaction terminal may determine that the transaction card is on the list of cards to be disabled and respond to the authentication data accordingly. The processor on the transaction card may determine, based on the response to the card authentication data, that the transaction card is to be deactivated.

In response to receiving the indication to deactivate the transaction card the processor may execute the card deactivation system. The card deactivation system may perform the following operations. If the transaction card includes a stripe (e.g., for reading card data), the card deactivation system may apply an electric current to a stripe deactivating element that deactivates at least a portion of one or more tracks of a stripe on the transaction card. For example, the card deactivation system may apply electric current (e.g., alternating current or direct current) to a magnetic field generating element located under the one or more tracks of the stripe on the transaction card to demagnetize at least a portion of the one or more tracks of the stripe on the transaction card. For example, as a result of the operation a leading centimeter of the magnetic stripe may be demagnetized such that the data encoded in that leading centimeter may not be read, which renders the whole stripe unusable.

In some embodiments, the magnetic field generating element may include one or more coils located under the stripe. Thus, applying the electric current (e.g., alternating current or direct current) to the one or more tracks may include applying the electric current (e.g., alternating current or direct current) to the one or more coils that are positioned under the one or more tracks.

The card deactivation system may also disable the processor on the card. Thus, the card deactivation system may cause, via a built-in circuit, a predetermined increase in the electrical current to the processor that causes a pathway that enables power distribution to the processor to be destroyed. In some embodiments, the transaction card may be equipped with a micro fuse (or another suitable fuse). Thus, when the card deactivation system increases the voltage through the micro fuse, the micro fuse melts due to too much heat and disrupts power to the processor. In some embodiments, the transaction card may be equipped with a patch antenna which is enabled to receive wireless signals. The patch antenna may be placed on or under the surface (e.g., under the stripe) of the transaction card. Thus, the patch antenna may receive the signal from, for example, a transaction terminal, and pass that signal to the processor. In response to determining that the signal includes an indicator to deactivate the transaction card. The processor may then cause, via the built-in circuit, the predetermined increase in the electrical current to the one or more processors.

In some embodiments, it may be useful to mark the transaction card is disabled so that a human or a card reader and/or a card terminal may detect the marking and not allow the card to be used. Thus, a heating element may be built into the transaction card that may activate a dye dispenser within the transaction card to change at least a portion of a surface of the transaction card. The activation of the dye dispenser may cause a pattern to be formed on or under the surface of the transaction card. The pattern may be read by a card reader or may be noticed by a human, thus, causing the transaction card to be unusable.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION OF THE INVENTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
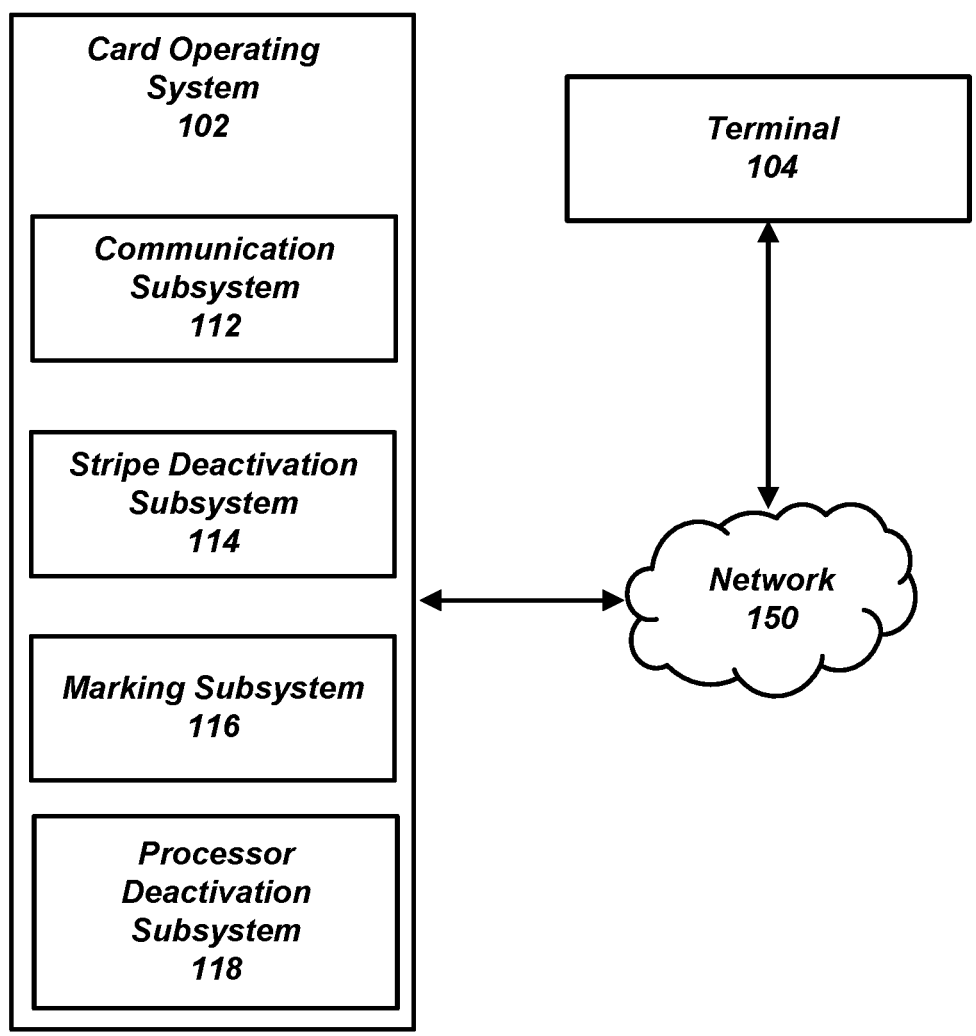
FIG. 1 shows an illustrative system for locally deactivating transaction cards to prevent offline transactions, in accordance with one or more embodiments of this disclosure.

FIG. 1 shows environment 100, which includes card operating system 102 and terminal 104. Card operating system 102 may execute instructions for locally deactivating transaction cards to prevent offline transactions. Data processing system 102 may include software, hardware, or a combination of the two. For example, data processing system 102 may be built into a chip embedded into a transaction card (e.g., build security card, credit card, or another suitable object). Thus, although the current disclosure is discussed in terms of transaction cards, the same systems and methods may be applied to any object that may be in a user's possession.

Terminal 104 may be a computing device with an associated card reader. The card reader may be a physical object into which the transaction card is inserted. In some embodiments, the card reader may be a computing device equipped with wireless communication capabilities and may communicate with the transaction card wireless (e.g., using near field communication (NFC) protocol or another similar protocol). In some embodiments, terminal 104 may perform transaction card authentication and store deactivated card lists or access remote systems where those cards may be stored. Network 150 may be a local area network or a direct connection between card operating system 102 associated with the transaction card and terminal 104.

In some embodiments, the transaction card may be a credit card, a debit card, or another suitable object enabling purchasing good. The transaction card may be read by a card reader built into a purchasing system (e.g., a point-of-sale) system. In some embodiments, the transaction card may be an access card having a stripe and/or a processing system (e.g., operating system 102). In these instances, the transaction card may be read by card readers (e.g., transaction terminals) situated in doors.

Card operating system 102 may receive a signal from a transaction terminal (e.g., terminal 104) requesting a connection with the transaction card. Card operating system 102 may receive the signal using communication subsystem 112. Communication subsystem 112 may include software components, hardware components, or a combination of both. For example, communication subsystem 112 may include a network component (e.g., a wireless antenna and/or a networking processor with physical connectors enabling a connection to a transaction terminal) that is used together with software to drive the network component. For example, the transaction terminal (e.g., terminal 104) may be equipped with a system to detect when a transaction card is in the vicinity. In some embodiments, that system may be a system that supports the NFC protocol.

Card operating system 102 may (via communication subsystem 112) establish a connection with the transaction terminal. In some embodiments, as part of establishing the connection, card operating system 102 may use an electrical current supplied by the transaction terminal to power the processor (and other hardware) associated with the card operating system 102. However, in some embodiments, the card operating system may have access to its own power source (e.g., a battery connected with the transaction card or with another transaction device). For example, a different transaction device may be a fob having a battery or device of another form-factor. Card operating system 102 may establish a connection with a computing device associated with a card reader or another type of transaction terminal. Thus, card operating system 102 (via communication subsystem 112) may respond to the received signal to establish a connection. The transaction terminal may then exchange authentication information with card operating system 102 so that the connection may be established.

Card operating system 102 may then receive an indication to deactivate the transaction card. For example, the transaction terminal may store a list of cards that have been deactivated via software (e.g., via a graphical user interface of a computing device). In one embodiment, a server computing device may store a database of all transaction cards and corresponding status of each card (e.g., enabled disabled). The database may store other information about the cards (e.g., transaction limits on each card and other suitable information). Some terminals may receive (e.g., request and receive) lists of cards that have been disabled while some may not. For example, some terminals may connect to a computing device hosting the card database and may receive, from the database, a status of the card. Thus, those terminals may determine that the card should be rejected right away. However, some terminals may be remote terminals that are not connected to the database and may receive updates upon a connection. For example, some terminals may be wireless terminals that are able to read card data and save transaction (e.g., credit or debit card transactions) in the terminal's memory. When the terminal is connected back into the network, the terminal may upload the transaction data to a connected computing device. In this instance, the terminal may not be away that a transaction card has been disabled and may process the transaction. Thus, if a terminal that is able to detect that the transaction has been disabled, sends a command to the processor of the transaction card to deactivate the card, any remote terminal where the transaction card is used in the future will be unable to process any transactions using that transaction card.

In some embodiments, the card operating system 102 may receive the indication to deactivate the transaction card during the connection establishing process. Car operating system 102 may transmit (e.g., via communication subsystem 112) card authentication data to the transaction terminal. Card authentication data may include a card identifier (e.g., an encrypted card identifier). In some embodiments, a card reader associated with the transaction terminal may read the card identifier and other data from a stripe of the card. The transaction terminal may determine whether the card is active or disabled (e.g., based on data within a database). Based on determining that the card is disabled, the transaction terminal may send, to the processor on the card, a deactivation command. For example, the deactivation command may be a special code (e.g., an alpha-numeric string, or another code) that can be interpreted by a processor on the transaction card. The processor on the transaction card may receive from the transaction terminal (e.g., via communication subsystem 112) a response to the card authentication data. The processor may include programming code that processes the response and may determine, based on the response, that the transaction card is to be deactivated. For example, instead of a regular response that indicates that connection has been established, card operating system 102 may receive a destruct code.

When the indication to deactivate the transaction card is received, car operating system 102 may determine which components of the transaction card should be disabled. For example, if the card has a magnetic stripe, card operating system 102 may activate stripe deactivation subsystem 114. Card operating system 102 may also activate processor deactivation subsystem 118 to complete the deactivation. In some embodiments, car operating system 102 may activate marking subsystem 116 to mark the card as deactivated. Each of these subsystems may have hardware and software components and the processor associated with the transaction card may use those components to deactivate the card.

In some embodiments, the transaction card may include a magnetic stripe. Thus, card operating system 102 may activate stripe deactivation subsystem 114. Stripe deactivation subsystem 114 may apply an electric current to a stripe deactivating element that deactivates at least a portion of one or more tracks of a stripe on the transaction card. In some embodiments, the stripe deactivating element may be a magnetic field generating element (e.g., a coil) located under the magnetic stripe. Thus, stripe deactivation subsystem 114 may apply electric current (e.g., alternating current or direct current) to a magnetic field generating element located under the one or more tracks of the stripe on the transaction card to demagnetize at least a portion of the one or more tracks of the stripe on the transaction card. That is, in some embodiments, the magnetic stripe may have multiple tracks. Each track may hold different information needed to use the card (e.g., that the card reader may need to authenticate and use the card). Thus, it may be enough to disable one of the tracks, a portion of one of the tracks, or a portion of one or more tracks. In general, any element may be used to deactivate the transaction card that is able to demagnetize a part of the stripe (e.g., an inch of the stripe) or a part of a track of a stripe. As discussed above, this element may be a coil. Thus, one or more coils may be placed under the magnetic stripe.

Figure 2:
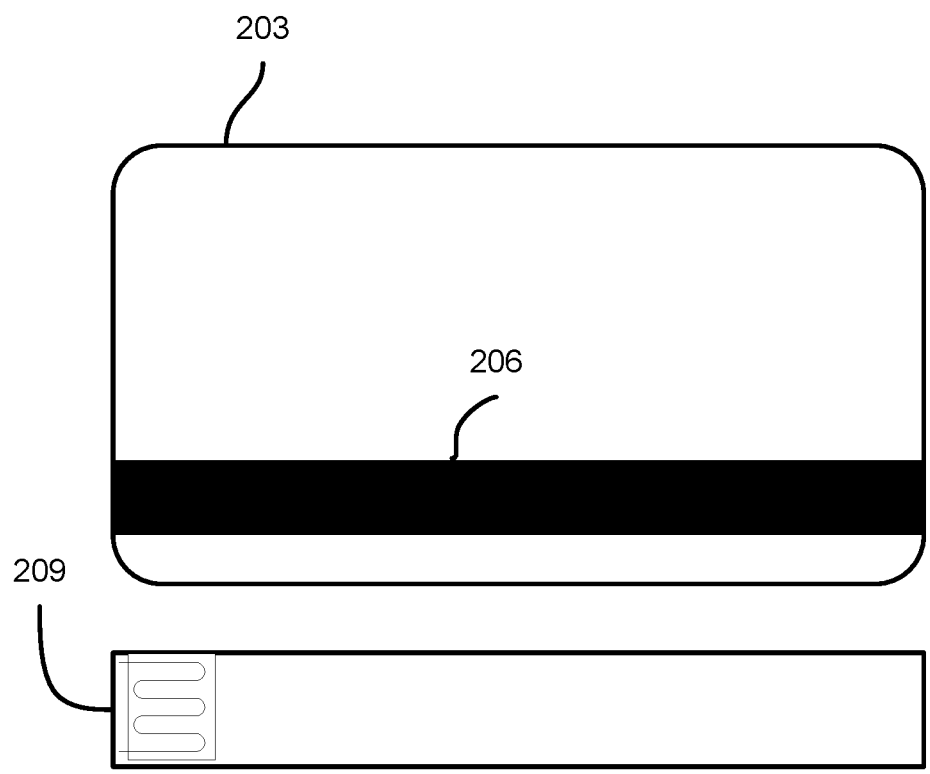
FIG. 2 illustrates a transaction card with a built-in coil, in accordance with one or more embodiments of this disclosure.

FIG. 2 illustrates a transaction card 203 with a built-in coil. Transaction card 203 is illustrated as having a magnetic stripe 206. Cross-section view 209 illustrates a coil that may be placed under the stripe. The coil may be connected to a power source or may be able to receive power from the transaction terminal. Thus, stripe deactivation subsystem 114 may apply the electric current (e.g., alternating current or direct current) to the coil shown in cross-section 209. In some embodiments, multiple coils may be placed under the magnetic stripe. For example, multiple coils may provide a larger magnetic field and/or multiple magnetic fields to demagnetize the magnetic stripe. In some embodiments, instead of or in addition to the magnetic field generating element, a heating element may be built under the stripe. Thus, the heating element may heat up the magnetic stripe permanently destroying the magnetic stripe.

In some embodiments, card operating system 102 may cause a display of markings on the transaction card indicating that the card should not be used for any transactions. Card operating system 102 may activate marking subsystem 116. Marking subsystem 116 may include hardware and software. For example, marking subsystem 116 may include a heating element, a dye dispenser filled with dye, and software to activate the heating element which in turn activates the dye dispenser. Thus, marking subsystem 116 may cause a heating element built into the transaction card to activate a dye dispenser within the transaction card to change at least a portion of a surface of the transaction card. In some embodiments, the marking may generate a pattern on the surface of the transaction card (e.g., characters).

Figure 3:
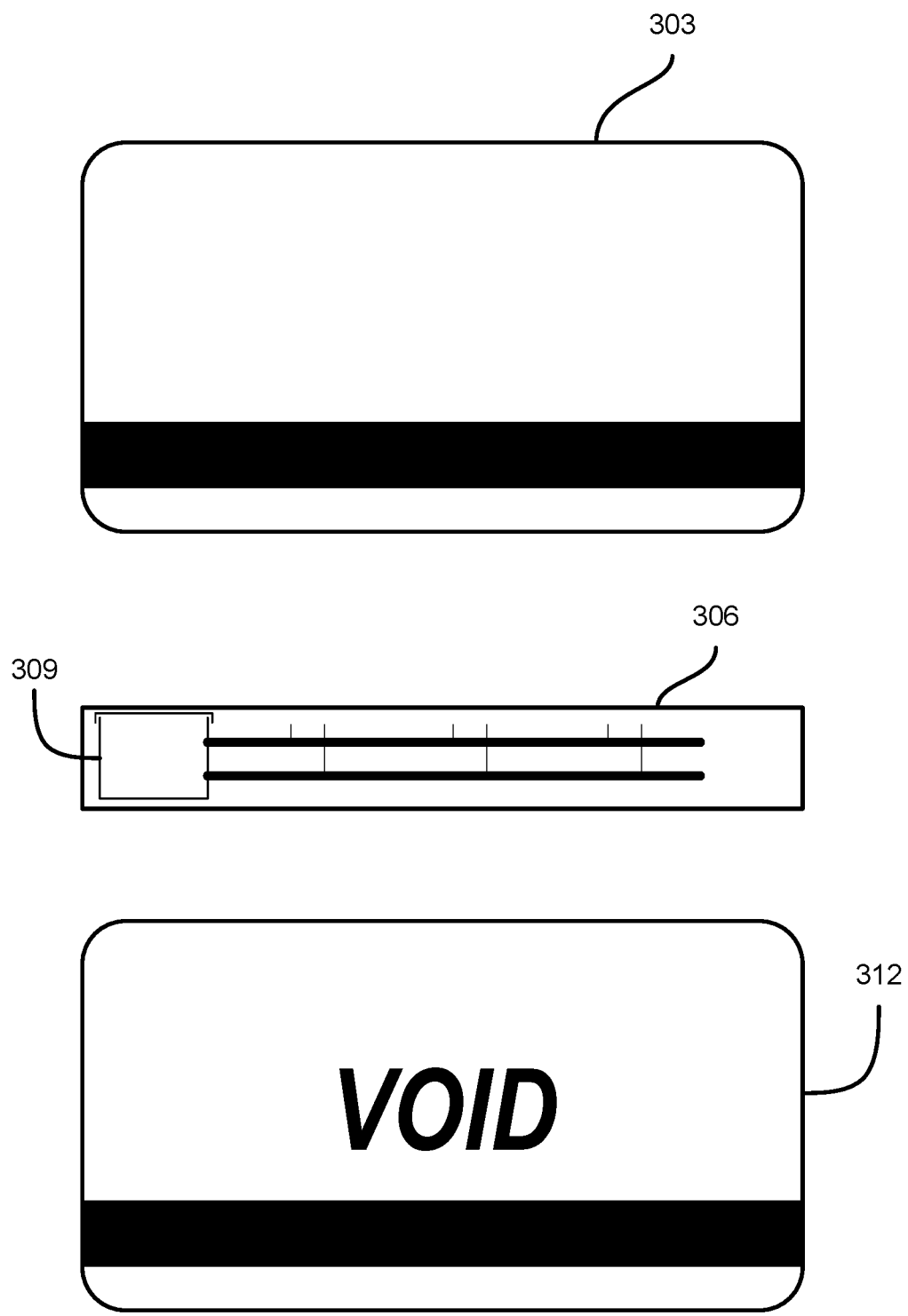
FIG. 3 illustrates a mechanism for marking a transaction card as disabled, in accordance with one or more embodiments.

FIG. 3 illustrates a mechanism for marking a transaction card as disabled. FIG. 3 illustrates transaction card 303. The transaction card may include a magnetic stripe and/or a processor (not shown). View 306 shows a cross-section of the transaction. The cross-section includes a dye dispenser with a heating mechanism 309. The dye may be distributed by the dispenser throughout the card (e.g., just below the surface). As a result of the dye being dispensed markings may be visible on the surface of the transaction card. View 312 shows markings on the transaction card. Although view 312 shows letter on the surface of the transaction card, the markings may be any kind of marking (e.g., a disable code). For example, any transaction terminal may be programmed to read the markings on the transaction card and determine, based on those markings, that the card has been locally disabled.

In some embodiments, card operating system 102 may cause the processor associated with the transaction card to be permanently disabled (e.g., destroyed). Card operating system 102 may activate processor deactivation subsystem 118. Card deactivation subsystem 118 may include hardware and software components. For example, card deactivation subsystem 118 may include an electric circuit that is able to supply enough electric current to physical disable the processor hosting card operating system 102. Thus, card deactivation subsystem 118 may cause, via a built-in circuit, a predetermined increase in the electrical current to the processor that causes a pathway that enables power distribution to the processor to be destroyed.

Figure 4:
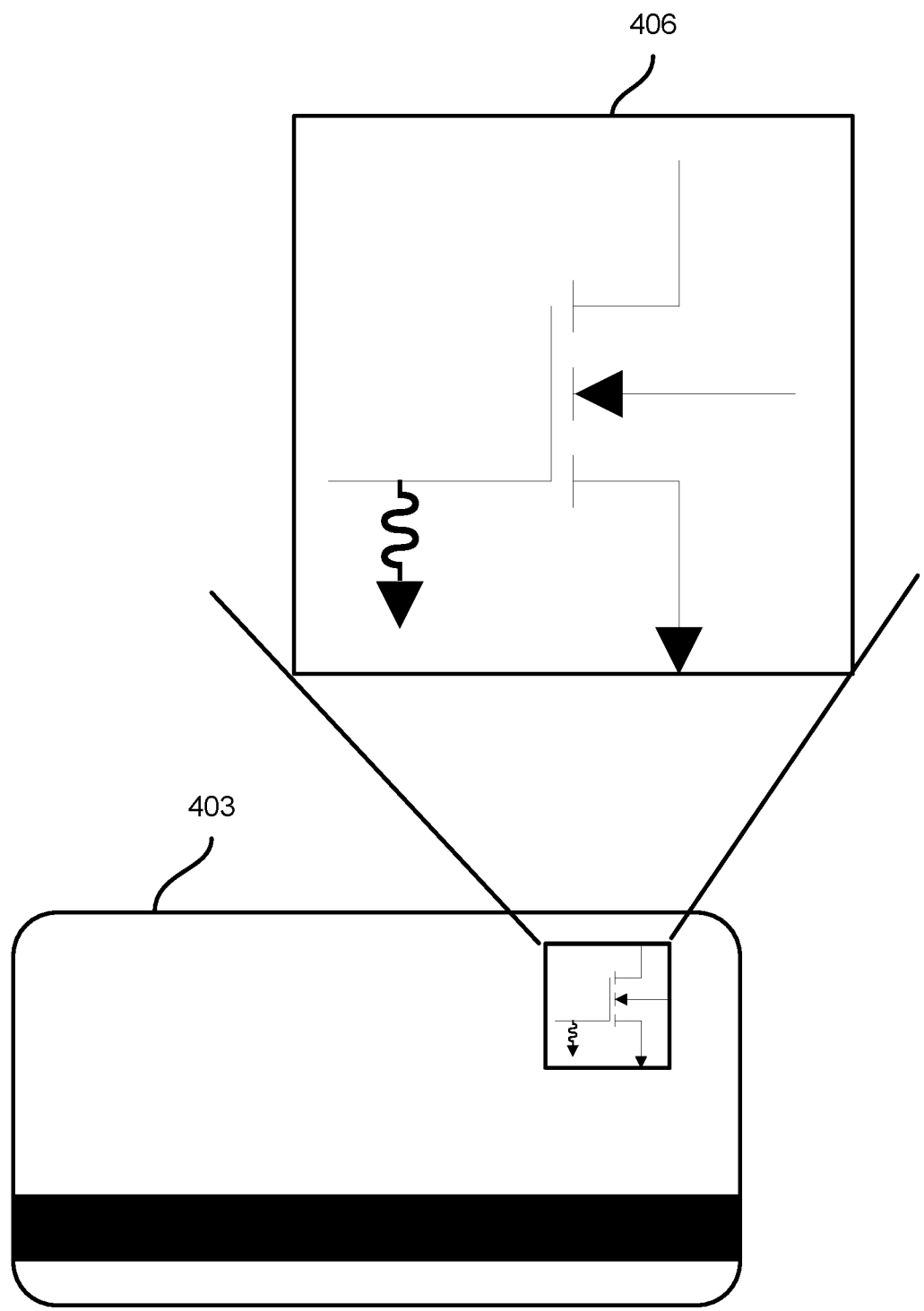
FIG. 4 illustrates a transaction card with a circuit for physically deactivating a processor, in accordance with one or more embodiments.

FIG. 4 illustrates a transaction card with a circuit for physically deactivating a processor. Transaction card 403 may include an electric circuit 406 that may be activated to permanently disable the processor. Electric circuit 406 may be a metal-oxide-semiconductor field-effect transistor (MOSFET). Electric circuit 406 may be used to amplify voltage (e.g., increase the voltage) and send the amplified voltage into the processor associated with the transaction card. As a result, the processor's pathway for power distribution may be fused or otherwise disabled, thereby disabling the processor. In some embodiments, electric circuit 406 may be used to amplify voltage of an alternating current. With current technology it may be easier to cause a voltage increase in an alternating current than direct current.

In some embodiments, electric circuit 406 may draw power from the transaction terminal either via contact with the transaction terminal or via a wireless connection (e.g., via magnetic field). Thus, processor deactivation subsystem 118 may initiate a power draw to the built-in circuit (e.g., to the MOSFET circuit). Once the voltage gets to the fuse, the fuse will be overloaded thereby disabling power distribution to the processor.

In some embodiments, the transaction card may be equipped with a patch antenna. The patch antenna may be located under the surface of the transaction card. Thus, the deactivation signal may be received by the patch antenna and the patch antenna may trigger (e.g., via an electric signal) the built-in circuitry to increase the voltage to disable the processor (e.g., increase the voltage to the fuser). Thus, processor deactivation subsystem 1118 may cause, via the built-in circuit, the predetermined increase in the electrical current to the processor, in response to determining that the signal comprises an indicator to deactivate the transaction card.

Computing Environment

Figure 5:
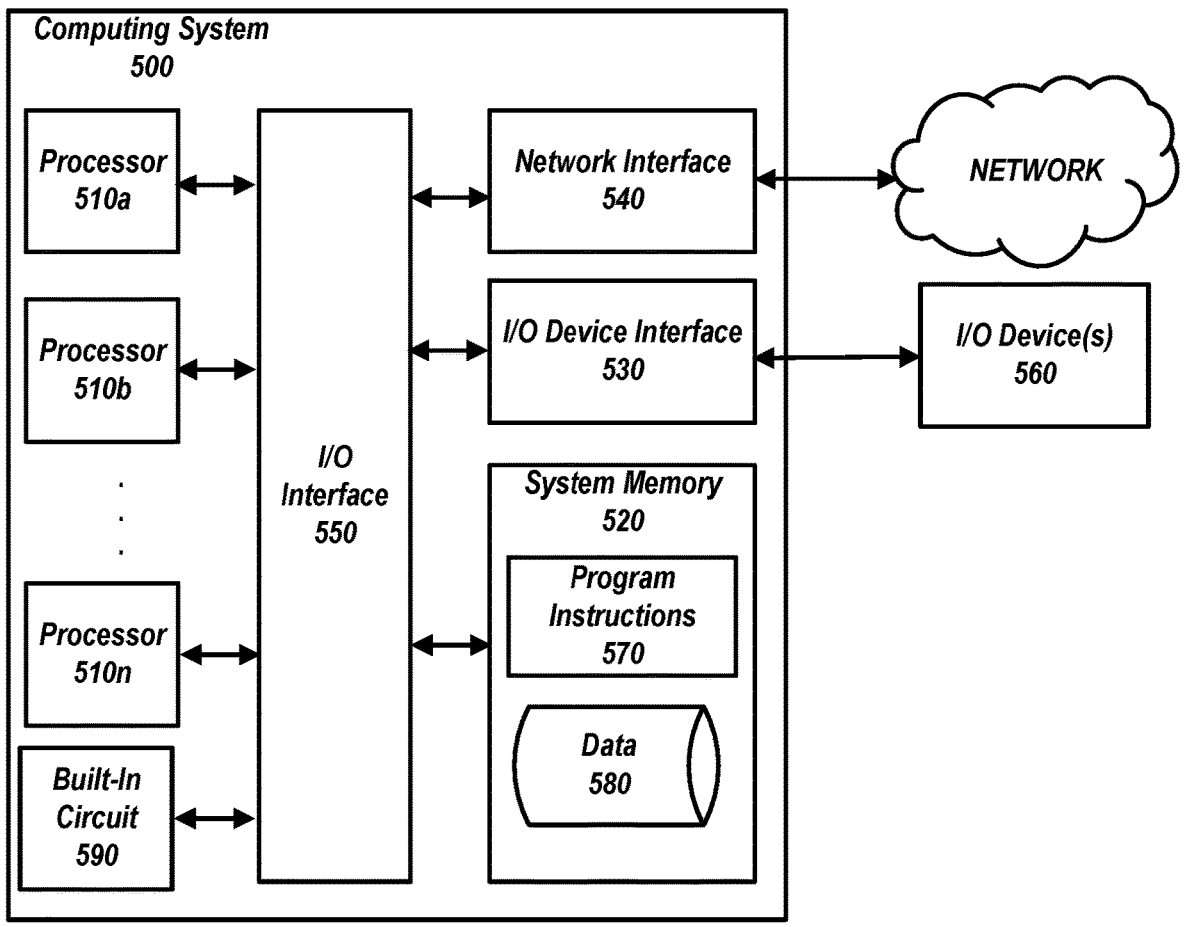
FIG. 5 shows an example computing system that may be used in accordance with one or more embodiments.

FIG. 5 shows an example computing system that may be used in accordance with some embodiments of this disclosure. In some instances, computing system 500 may be built into a transaction card or another suitable device (e.g., a fob). A person skilled in the art would understand that those terms may be used interchangeably. The components of FIG. 5 may be used to perform some or all operations discussed in relation with FIGS. 1-4. Furthermore, various portions of the systems and methods described herein may include or be executed on one or more computing systems similar to computing system 500. Further, processes and modules described herein may be executed by one or more processing systems similar to that of computing system 500.

Computing system 500 may include one or more processors (e.g., processors 510a-510n) connected with system memory 520, an input/output I/O device interface 530, and a network interface 540 via an input/output (I/O) interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uniprocessor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output.

I/O device interface 530 may provide an interface for connection of one or more I/O devices 560 to computing system 500. I/O devices may include card readers, transaction terminals and other computing devices able to read transaction cards and other suitable devices (e.g., fobs).

Network interface 540 may include a network adapter that provides for connection of computing system 500 to a network. Network interface 540 may facilitate data exchange between computing system 500 and other devices connected to the network. Network interface 540 may support a contact connection or wireless communication.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard disk drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard. Computing system 500 may include a built-in circuit 590 for disabling the computing system.

Operation Flow

Figure 6:
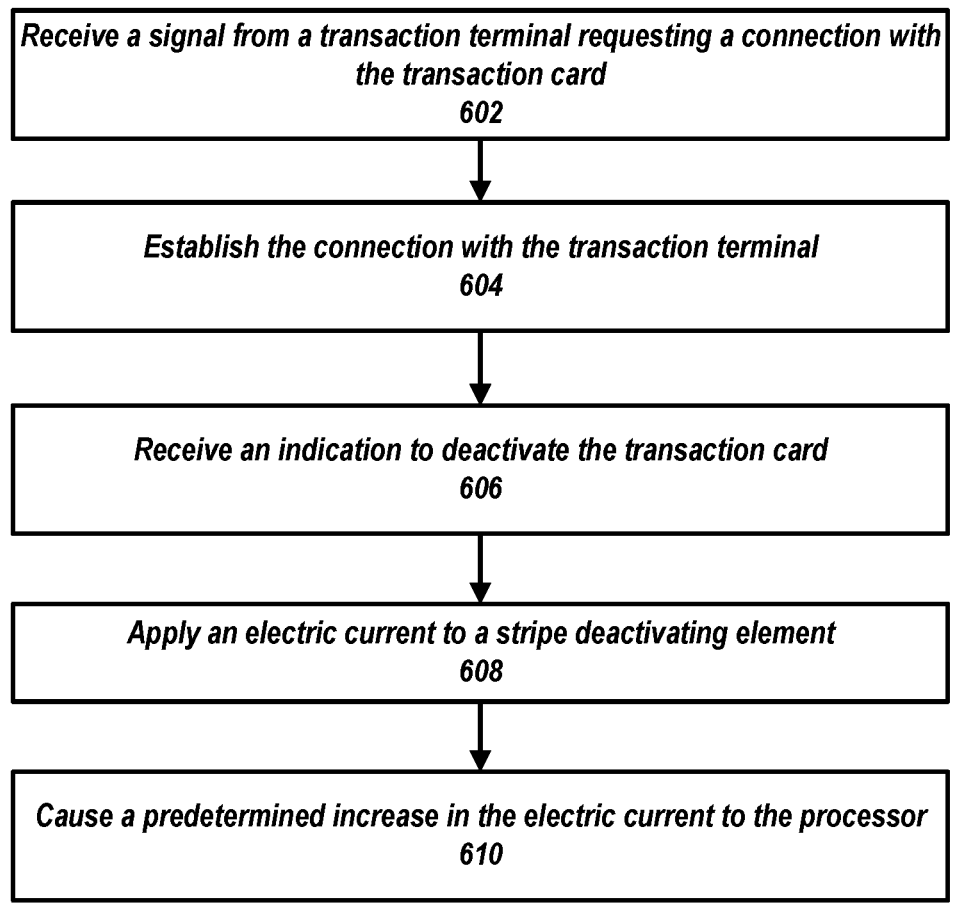
FIG. 6 is a flowchart of operations for locally deactivating transaction cards to prevent offline transactions, in accordance with one or more embodiments.

FIG. 6 is a flowchart 600 of operations for locally deactivating transaction cards to prevent offline transactions. The operations of FIG. 6 may use components described in relation to FIG. 5. In some embodiments, card operating system 102 may include one or more components of computer system 500. At 602, card operating system 102 receives a signal from a transaction terminal requesting a connection with the transaction card. For example, card operating system 102 may receive the signal via network interface 540 or via I/O device interface 530 when the card is inserted into a card reader (e.g., associated with a transaction terminal). At 604, card operating system 102 establishes the connection with the transaction terminal. Card operating system 102 may establish a connection through network interface 540 and/or I/O device interface 530 using processor 510a. At 606, card operating system 102 receives an indication to deactivate the transaction card. Card operating system 102 may receive the indication through network interface 540 and/or I/O device interface 530. At 608, card operating system 102 applies an electric current to a stripe deactivating element. Card operating system 102 may use one or more processors 510a, 510b, and/or 510n to perform this operation.

At 610, card operating system 102 causes a predetermined increase in the electric current to the processor. Card operating system 102 may use one or more processors 510a, 510b, and/or 510n to send an activation command to built-in circuitry 590 through I/O interface 550.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, at a processor associated with a transaction card, a signal from a transaction terminal requesting a connection with the transaction card; establishing the connection with the transaction terminal, wherein establishing the connection comprises using an electrical current supplied by the transaction terminal to power the processor; receiving, by the processor, an indication to deactivate the transaction card; in response to receiving the indication to deactivate the transaction card: applying an electric current to a stripe deactivating element that deactivates at least a portion of one or more tracks of a stripe on the transaction card; and causing, via a built-in circuit, a predetermined increase in the electric current to the processor that causes a pathway that enables power distribution to the processor to be destroyed.

2. Any of the proceeding embodiments, wherein applying the electric current to the stripe deactivating element comprises applying alternating current to a magnetic field generating element located under the one or more tracks of the stripe on the transaction card to demagnetize at least a portion of the one or more tracks of the stripe on the transaction card.

3. Any of the proceeding embodiments, wherein the magnetic field generating element comprises one or more coils located under the stripe, and wherein applying the alternating current to the one or more tracks comprises applying the alternating current to the one or more coils.

4. Any of the proceeding embodiments, further comprising causing a heating element built into the transaction card to activate a dye dispenser within the transaction card to change at least a portion of a surface of the transaction card.

5. Any of the proceeding embodiments, wherein causing the heating element built into the transaction card to activate the dye dispenser comprises causing the dye dispenser to generate a pattern on the surface of the transaction card.

6. Any of the proceeding embodiments, wherein a processor is associated with a fuse, and wherein the instructions further cause the built-in circuit to draw power from the transaction terminal and generate the electric current that causes an element of the fuse to melt.

7. Any of the proceeding embodiments, wherein establishing the connection with the transaction terminal comprises: transmitting card authentication data to the transaction terminal; receiving from the transaction terminal a response to the card authentication data; and determining, based on the response to the card authentication data, that the transaction card is to be deactivated.

8. Any of the proceeding embodiments, further comprising: receiving the signal via a patch antenna on the transaction card, wherein the patch antenna is located on or under a surface of the transaction card; and causing, via the built-in circuit, the predetermined increase in the electrical current to the processor, in response to determining that the signal comprises an indicator to deactivate the transaction card.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for locally deactivating transaction cards to prevent offline transactions, the system comprising:
a transaction card;
a magnetic stripe affixed to the transaction card, wherein the magnetic stripe comprises one or more tracks;
a processor affixed to the transaction card; and
a non-transitory computer-readable storage medium affixed to the transaction card and storing instructions, which when executed by the processor cause the processor to perform operations comprising:
receiving, by the processor affixed to the transaction card, a signal from a transaction terminal requesting a connection with the transaction card;
establishing the connection with the transaction terminal, wherein establishing the connection comprises using an electric current supplied by the transaction terminal to power the processor;
receiving, by the processor affixed to the transaction card during an authentication of the transaction card, a command to deactivate the transaction card; and
in response to receiving the command to deactivate the transaction card:
applying, using the processor affixed to the transaction card, the electric current supplied by the transaction terminal to a magnetic field generating element affixed to the transaction card to demagnetize at least a portion of the one or more tracks associated with the transaction card;
causing, via a built-in circuit affixed to the transaction card, a predetermined increase, to the processor, in the electric current supplied by the transaction terminal that causes a pathway that enables power distribution to the processor to be destroyed; and
causing a heating element built into the transaction card to activate a dye dispenser within the transaction card to change at least a portion of a surface of the transaction card.

2. The system of claim 1, wherein the magnetic field generating element comprises one or more coils located under the magnetic stripe, and wherein the instructions for applying the electric current to the one or more tracks comprise instructions for applying alternating current to the one or more coils until the one or more tracks are demagnetized.

3. The system of claim 1, wherein the instructions for establishing the connection with the transaction terminal further cause the processor to perform operations comprising:
transmitting card authentication data to the transaction terminal;
receiving from the transaction terminal, a response to the card authentication data; and
determining, based on the response to the card authentication data, that the transaction card is to be deactivated.

4. A method comprising:
receiving, at a processor affixed to a transaction card, a signal from a transaction terminal requesting a connection with the transaction card;
establishing the connection with the transaction terminal, wherein establishing the connection comprises using an electric current supplied by the transaction terminal to power the processor;
receiving, by the processor, an indication to deactivate the transaction card; and
in response to receiving the indication to deactivate the transaction card:
applying, using the processor affixed to the transaction card, the electric current supplied by the transaction terminal to a stripe deactivating element that deactivates at least a portion of one or more tracks of a stripe on the transaction card;
causing, using the processor via a built-in circuit, a predetermined increase in the electric current to the processor that causes a pathway that enables power distribution to the processor to be destroyed; and
causing a heating element built into the transaction card to activate a dye dispenser within the transaction card to change at least a portion of a surface of the transaction card.

5. The method of claim 4, wherein applying the electric current to the stripe deactivating element comprises applying alternating current to a magnetic field generating element located under the one or more tracks of the stripe on the transaction card to demagnetize at least the portion of the one or more tracks of the stripe on the transaction card.

6. The method of claim 5, wherein the magnetic field generating element comprises one or more coils located under the stripe, and wherein applying the alternating current to the one or more tracks comprises applying the alternating current to the one or more coils.

7. The method of claim 4, wherein causing the heating element built into the transaction card to activate the dye dispenser comprises causing the dye dispenser to generate a pattern on the surface of the transaction card.

8. The method of claim 4, wherein the processor is connected with a fuse, further comprising causing the built-in circuit to draw power from the transaction terminal that causes an element of the fuse to melt.

9. The method of claim 4, wherein establishing the connection with the transaction terminal comprises:
transmitting card authentication data to the transaction terminal;
receiving, from the transaction terminal, a response to the card authentication data; and
determining, based on the response to the card authentication data, that the transaction card is to be deactivated.

10. The method of claim 4, further comprising:
  receiving the signal via a patch antenna on the transaction card, wherein the patch antenna is located on or under a surface of the transaction card; and
  causing, via the built-in circuit, the predetermined increase in the electric current to the processor, in response to determining that the signal comprises an indicator to deactivate the transaction card.

11. A non-transitory, computer-readable medium storing instructions for locally deactivating transaction cards to prevent offline transactions, when executed by one or more processors affixed to a transaction card, cause the one or more processors to perform operations comprising:
  receiving, at the one or more processors affixed to the transaction card, a signal from a transaction terminal requesting a connection with the transaction card;
  establishing the connection with the transaction terminal, wherein establishing the connection comprises using an electric current supplied by the transaction terminal to power the one or more processors;
  receiving, by the one or more processors affixed to the transaction card, an indication to deactivate the transaction card;
  in response to receiving the indication to deactivate the transaction card, applying, using the one or more processors the electric current supplied by the transaction terminal to a stripe deactivating element that deactivates at least a portion of one or more tracks of a stripe on the transaction card; and
  causing a heating element built into the transaction card to activate a dye dispenser within the transaction card to change at least a portion of a surface of the transaction card.

12. The non-transitory, computer-readable medium of claim 11, wherein the instructions for applying the electric current to the stripe deactivating element further cause the one or more processors to apply alternating current to a magnetic field generating element located under the one or more tracks of the stripe on the transaction card to demagnetize at least the portion of the one or more tracks of the stripe on the transaction card.

13. The non-transitory, computer-readable medium of claim 12, wherein the magnetic field generating element comprises one or more coils located under the stripe, and wherein the instructions for applying the alternating current to the one or more tracks cause the one or more processors to apply the alternating current to the one or more coils.

14. The non-transitory, computer-readable medium of claim 11, wherein the instructions cause, via a built-in circuit, a predetermined increase in the electric current to the one or more processors that causes a pathway that enables power distribution to the one or more processors to be destroyed.

15. The non-transitory, computer-readable medium of claim 11, wherein a processor is connected with a fuse, and wherein the instructions further cause a built-in circuit affixed to the transaction card to draw power from the transaction terminal and generate the electric current that causes an element of the fuse to melt.

16. The non-transitory, computer-readable medium of claim 14, wherein the instructions for establishing the connection with the transaction terminal further cause the one or more processors to perform operations comprising:
  transmitting card authentication data to the transaction terminal;
  receiving, from the transaction terminal, a response to the card authentication data; and
  determining, based on the response to the card authentication data, that the transaction card is to be deactivated.

17. The non-transitory, computer-readable medium of claim 16, wherein the instructions further cause the one or more processors to perform operations comprising:
  receiving the signal via a patch antenna on the transaction card, wherein the patch antenna is located on or under the surface of the transaction card; and
  causing, via the built-in circuit, the predetermined increase in the electric current to the one or more processors, in response to determining that the signal comprises an indicator to deactivate the transaction card.

* * * * *